US009939031B2

(12) United States Patent
Schweiher et al.

(10) Patent No.: US 9,939,031 B2
(45) Date of Patent: Apr. 10, 2018

(54) HYBRID AUTOMOTIVE TRANSMISSION ARRANGEMENT

(71) Applicant: GETRAG Getriebe-und Zahnradfabrik Hermann Hagenmeyer GmbH & Cie KG, Untergruppenbach (DE)

(72) Inventors: Mark Schweiher, Lauffen (DE); Thomas Hoffmeister, Korntal-Muenchingen (DE); Harald Ihben, Ludwigsburg (DE)

(73) Assignee: GETRAG GETRIEBE-UND ZAHNRADFRABRIK HERMANN HAGENMEYER GMBH & CIE KG, Untergruppenbach (DE)

( * ) Notice: Subject to any disclaimer, the term of this patent is extended or adjusted under 35 U.S.C. 154(b) by 301 days.

(21) Appl. No.: 14/731,775

(22) Filed: Jun. 5, 2015

(65) Prior Publication Data

US 2015/0362025 A1 Dec. 17, 2015

(30) Foreign Application Priority Data

Jun. 11, 2014 (DE) .................. 10 2014 108 181

(51) Int. Cl.
*F16H 3/08* (2006.01)
*F16D 43/21* (2006.01)
(Continued)

(52) U.S. Cl.
CPC ............ *F16D 43/211* (2013.01); *B60K 6/387* (2013.01); *B60K 6/48* (2013.01); *B60K 6/485* (2013.01);
(Continued)

(58) Field of Classification Search
CPC ...................... F16H 37/021; F16H 2003/0931
(Continued)

(56) References Cited

U.S. PATENT DOCUMENTS 6,634,247 B2 * 10/2003 Pels .......................... B60K 6/26
477/6
2002/0082134 A1 6/2002 Hirt et al.
(Continued)

FOREIGN PATENT DOCUMENTS

CN 200989274 Y 12/2007
CN 103388655 A 11/2013
(Continued)

OTHER PUBLICATIONS

Search Report dated Nov. 4, 2015 in corresponding European application No. 15169861.0.

*Primary Examiner* — Ha Dinh Ho
(74) *Attorney, Agent, or Firm* — Knobbe Martens Olson & Bear LLP

(57) ABSTRACT

Hybrid automotive transmission arrangement with a gear transmission for establishing at least one transmission ratio between a transmission input and a transmission output, wherein the gear transmission has a gear set with a coupling gear. An electric machine has a machine output shaft with a drive gear, which is coupled directly or via a coupling gear set to the coupling gear of the transmission gear set so that a power transmission pathway is established from the machine output shaft to the coupling gear. A slip clutch is arranged in the power transmission path.

12 Claims, 3 Drawing Sheets

(51) Int. Cl.
*B60K 6/48* (2007.10)
*F16D 7/02* (2006.01)
*F16H 3/00* (2006.01)
*F16H 35/10* (2006.01)
*B60K 6/387* (2007.10)
*B60K 6/485* (2007.10)
*B60K 6/547* (2007.10)
*B60W 20/00* (2016.01)
*F16D 48/06* (2006.01)
*F16H 3/093* (2006.01)

(52) U.S. Cl.
CPC ............ *B60K 6/547* (2013.01); *B60W 20/00* (2013.01); *F16D 7/02* (2013.01); *F16D 7/028* (2013.01); *F16D 43/218* (2013.01); *F16D 48/06* (2013.01); *F16H 3/006* (2013.01); *F16H 35/10* (2013.01); *B60K 2006/4825* (2013.01); *F16D 2500/1045* (2013.01); *F16D 2500/1066* (2013.01); *F16D 2500/7044* (2013.01); *F16H 2003/007* (2013.01); *F16H 2003/0931* (2013.01); *F16H 2200/003* (2013.01); *F16H 2200/0056* (2013.01); *Y10S 903/902* (2013.01); *Y10T 74/19014* (2015.01)

(58) Field of Classification Search
USPC .................................. 74/330, 331, 333, 340
See application file for complete search history.

(56) References Cited

U.S. PATENT DOCUMENTS

| | | | |
|---|---|---|---|
| 2005/0139035 A1* | 6/2005 | Lee .......................... | B60K 6/36 74/661 |
| 2005/0182533 A1 | 8/2005 | Tobler et al. | |
| 2008/0134819 A1* | 6/2008 | Kapp ..................... | F16H 61/32 74/331 |
| 2011/0265601 A1 | 11/2011 | Pastorello et al. | |
| 2013/0298709 A1 | 11/2013 | Weller et al. | |

FOREIGN PATENT DOCUMENTS

| | | |
|---|---|---|
| DE | 19945473 A1 | 6/2000 |
| DE | 10 2005 002 993 A1 | 9/2005 |
| DE | 10 2009 037 557 A1 | 2/2011 |
| DE | 102012009484 B3 | 9/2013 |
| EP | 2 385 270 A1 | 11/2011 |
| GB | 2321504 A | 7/1998 |
| JP | 2010-127382 A | 6/2010 |

* cited by examiner

HYBRID AUTOMOTIVE TRANSMISSION ARRANGEMENT

CROSS-REFERENCE TO RELATED APPLICATION

This application claims the priority of German patent application DE 10 2014 108 181.1, filed Jun. 11, 2014.

BACKGROUND

The present invention concerns a hybrid automotive transmission arrangement with a gear transmission for establishing at least one transmission ratio between a transmission input and a transmission output, wherein the gear transmission has a gear set with a coupling gear, with an electric machine which has a machine output shaft with a drive gear, which is coupled directly or via a coupling gear set to the coupling gear of the transmission gear set so that a power transmission pathway is established from the machine output shaft to the coupling gear.

Such a hybrid automotive transmission arrangement is known from DE 10 2012 009 484 C. Here, the gear transmission is a double clutch transmission with a plurality of transmission ratios. The electric machine is linked via the coupling gear to an input of one of the subtransmissions of the dual clutch transmission. In this layout, various hybrid modes can be realized, including a pure electric driving, a boost operation, a recuperation, etc. The linking of the electric motor to a coupling gear of a transmission gear set can ensure an axially compact design of the transmission layout, since no separate gear is needed in the gear transmission for the linking of the electric machine.

For this, it is proposed in the prior art either to connect the electric machine permanently to the coupling gear or to do so via an engagement clutch. The engagement clutch makes it possible either to connect the electric machine to the coupling gear or to disconnect it. The latter state is designed, for example, to reduce drag losses, etc.

In any case, the components of the hybrid automotive transmission layout are designed to absorb the maximum forces or moments occurring at any time. Since the forces or moments may be large, the individual components need to be dimensioned relatively large.

SUMMARY

In this context, one problem which the invention proposes to solve is to indicate an improved hybrid automotive transmission layout which makes it possible to design at least one component smaller and/or makes it possible to protect at least one component against an overload.

The above problem is solved in the hybrid automotive transmission layout mentioned above in that a slip clutch is arranged in the power transmission path.

The slip clutch can accomplish an overload protection for the gear transmission, especially for that gear set which connects the electric machine to the gear transmission. Moreover, the components located in the power flow can be designed or dimensioned so that they do not have to withstand all possibly occurring forces or force or torque peaks. Instead, the components can preferably be dimensioned or designed so that they can essentially transmit or withstand a torque which is oriented to a characteristic moment (such as the rated moment) of the electric machine.

Namely large reactive moments can occur in hybrid automotive transmission layouts of the kind mentioned above during abrupt deceleration on the transmission output and on account of the inertia of the electric machine. These reactive moments can be many times the rated moment. By arranging a slip clutch in the power transmission path, the components can be protected against an overload which could result in damaging them.

The aforementioned reactive moments can occur, for example, through various braking maneuvers and/or when locking a parking brake, since this can cause an abrupt deceleration of the transmission output.

The electric machine can be flanged to the gear transmission on the outside, but it can also be arranged in the transmission, i.e., integrated inside a housing of the gear transmission. The electric machine may be cooled in this case.

Thanks to arranging a slip clutch in the power transmission path, the components involved can be dimensioned smaller, for example in terms of shaft diameter, in terms of gear width, in terms of gear and/or shaft materials, in terms of bearing size, etc.

Preferably no other coupling is arranged in the power transmission path, such as an engagement clutch, although it is conceivable to arrange such an engagement clutch in serial or in parallel with the slip clutch.

The gear transmission is preferably a dual clutch transmission, but it could also be an axle drive, an automatic transmission with converter, or the like.

The slip clutch is preferably a torque-shifting clutch, especially a friction clutch, which is designed to operate with a particular friction locking. The slip clutch is preferably a passive, self-shifting coupling, in contrast with actuator-activated couplings. Of course, the slip clutch is preferably designed to be able to transmit torque up to a threshold torque value, and to open when torques are present which are greater than the threshold torque value, that is, it does not transmit at least the portion of the torque in excess of the threshold value.

The torque threshold value is designed so that the torques transmitted across the power transmission path do not exceed this threshold value during normal operation. However, the threshold value is less than a torque which can occur, for example, in the form of a reactive moment upon abrupt deceleration of the transmission output.

Thus, the problem is entirely solved.

It is of special benefit to design the slip clutch as an overload protection clutch, so that the slip clutch can transmit torque up to a threshold torque value, which is a function of a characteristic torque value of the electric machine.

In particular, the characteristic torque value is a rated torque of the electric machine, but it can also be a maximum torque of the electric machine.

In any case, the slip clutch is designed so that rated torques of the power transmission path can be safely transmitted.

According to another embodiment, the slip clutch is configured as an overload protection clutch, such that the slip clutch can transmit torques up to a threshold torque value which is a function of a maximum torque of the coupling gear.

In other words, the threshold value can also be oriented to how high the maximum torque is that can be transmitted by the coupling gear. Preferably, the threshold value depends both on this and on a characteristic torque value of the electric machine.

According to another preferred embodiment, a coupling transmission ratio is established between the machine output shaft and the coupling gear, wherein the threshold torque value is a function of the coupling transmission ratio.

Often the coupling transmission ratio is designed to convert high rotary speed of the electric machine into lower rotary speed of the coupling gear, so that the electric machine can preferably be operated in higher rotary speed ranges. In this way, the electric machine can be more compact in design, as a rule.

The threshold torque value depends preferably not only on the coupling transmission ratio, but also on where the slip clutch is arranged inside the power transmission path, i.e., in the region of the machine output shaft or in the region of the coupling gear, or in a region in between.

Moreover, on the whole, it is preferable for the slip clutch to have at least one friction taper pairing.

With such a friction taper pairing or friction cone system, an economical slip clutch can be produced, on the one hand. Moreover, such a friction taper pairing can be integrated relatively easily and compactly in the power transmission pathway.

The cone angle of the friction taper pairing is preferably less than 20°, especially less than 10°, and it is preferably larger than 3°, especially larger than 5°.

It is especially preferred when the friction taper pairing has a first friction cone at a first torque transmission element and a second friction cone at a second torque transmission element, wherein the first and second torque transmission elements are biased by a spring mechanism.

In this case, the threshold torque value can be adjusted by choice of the cone angle, by the magnitude of the pretension (which runs in particular in the axial direction), and also by the size and the material as well as surface quality of the first and the second friction cone.

Conical seats and rings can be realized in a way which is also customary in synchronous shift clutches of automotive transmissions, for example, by using conical friction rings made of brass or the like. In particular, the spring mechanism can be an annular disc spring mechanism, preferably being a standard component, in order to lower the cost.

The spring mechanism is braced in the axial direction preferably against a radially projecting segment, which is connected to a shaft in an axially and preferably rotationally firm manner. It is especially preferable for the spring mechanism to be braced in the axial direction against another gear, which is fixed to the shaft.

Moreover, it is advantageous for the first torque transmission element to be a friction taper ring, while the second torque transmission element is a friction taper gear, especially the driving gear or a gear of the coupling gear set.

In this way, the friction taper pairing can be realized with few additional components, since one of the torque transmission elements is a gear that is present any way to connect the electric machine and the coupling gear. However, the friction taper gear is of course modified so as to form a friction taper on it, or secure one to it.

In one variant, the friction taper gear is rigidly joined to a shaft. In this case, the friction taper ring can generally turn in relation to the shaft and is pressed by means of the spring mechanism against the friction taper of the friction taper gear. Such a simple friction taper system can be used, for example, when the threshold torque value is relatively low.

In an alternative embodiment, the friction taper ring is joined to a segment of a shaft firmly against rotation, but it is preferably axially movable in relation to the shaft segment.

In this embodiment, the friction taper gear is preferably rotatably supported in regard to the shaft segment, and/or it can be axially secured on the shaft segment.

Whereas in the embodiment where the friction taper gear is joined to the shaft firmly against rotation the friction taper is preferably formed on an outer circumferential segment of the friction taper gear, in the present variant it is preferable for the friction taper of the friction taper gear to be formed on an inner circumference of the friction taper gear.

The friction taper ring is preferably arranged in the radial direction between the friction taper gear and the shaft segment.

As mentioned above, it is generally conceivable for the slip clutch to be formed by a single friction taper pairing.

However, it is of special benefit for the friction taper gear to have two friction tapers, each one being assigned a friction taper ring which is joined to the shaft segment firmly against rotation.

The friction taper rings are preferably able to move axially in relation to the shaft segment.

In this embodiment, the slip clutch is formed by a dual taper system.

The friction tapers of the friction taper gear are preferably arranged at opposite angles in relation to an axis of the shaft, i.e., in a kind of X-arrangement.

It is generally conceivable to assign a spring mechanism to each of the friction taper rings, by means of which the friction taper rings are biased in opposite axial directions against the friction tapers of the friction taper gear.

However, it is of special benefit for one of the friction taper rings to be secured axially on the shaft segment, the spring mechanism being arranged between the other friction taper ring and a radial segment joined to the shaft segment.

In this embodiment, only a single spring mechanism is used in order to realize the axial pretension of the slip clutch. The radial segment which is joined to the shaft segment is preferably a radial segment of a gear joined to the shaft segment.

Moreover, it is advantageous overall for the friction taper gear to be a drive gear mounted on the machine output shaft.

In an alternative embodiment, the coupling gear set has a first intermediate gear and a second intermediate gear, which is arranged coaxially with the first intermediate gear, while the friction taper gear is the first and/or the second intermediate gear.

In this embodiment, the coupling gear set preferably has an intermediate shaft, on which the two intermediate gears are arranged, while preferably one of the two intermediate gears is the friction taper gear and the other intermediate gear is preferably firm against rotation and in particular is formed as a single piece with the intermediate shaft.

The slip coupling of the invention can in particular limit the transmissible torque in the power transmission pathway. The solution preferably provides a protection of gear components with slight additional weight as compared to a strengthening of the gear components to withstand a higher load, which would result from the reactive moments of the large mass inertias. The solution of the invention with slip clutch can thus also have cost benefits.

The slip clutch can have instead of a friction taper pairing also a multiple disc clutch. The axial biasing forces are smaller in this case than in one or more friction taper pairings, while on the other hand a more elaborate rotary entrainment through internal and external splines is necessary. The slip clutch can also be formed by multitaper friction systems, in which case the axial biasing forces can be less. Instead of a disc spring, cylindrical compression springs or flexural springs can also be used.

Preferably, the slip clutch is provided on an intermediate shaft, on which two gears are mounted. One gear can be mounted by needle bearings on the intermediate shaft, which is configured in particular as a double gear shaft. One of the gears can also be configured as a hollow shaft gear, with the gear forming the intermediate shaft.

Of course, the abovementioned and yet to be described features can be used not only in the particular indicated combination, but also in other combinations or by themselves, without leaving the scope of the present invention.

BRIEF DESCRIPTION OF THE SEVERAL VIEWS OF THE DRAWING

Sample embodiments of the invention are presented in the drawing and shall be explained more closely in the following description. There are shown.

PREFERRED EMBODIMENTS

Figure 1:
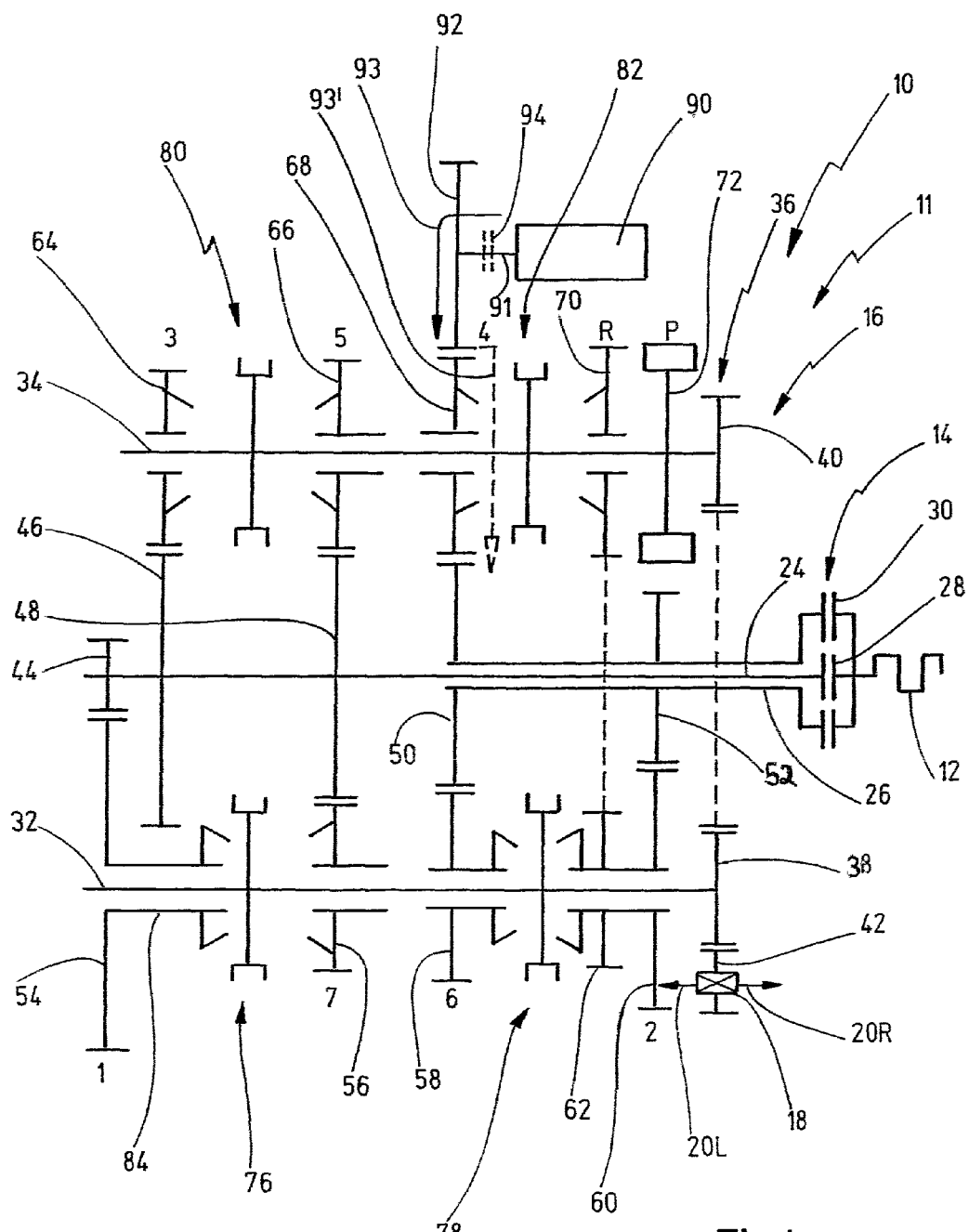
FIG. 1 a schematic representation of a drive train of a motor vehicle with one embodiment of a hybrid automotive transmission layout according to the invention, in which an electric machine can be coupled via a coupling gear set to a coupling gear.

FIG. 1 shows in schematic view a drive train 10 of a motor vehicle 11.

The drive train 10 contains a drive motor 12 such as an internal combustion engine, whose output shaft is connected to the input of a dual clutch arrangement 14. The outputs of the dual clutch arrangement 14 are connected to the input arrangement of a dual clutch transmission 16. An output of the dual clutch transmission 16 is connected to a differential 18, which distributes drive power to two driven wheels 20L, 20R.

The drive train is designed for transverse installation, especially for front transverse installation in the motor vehicle 11.

The dual clutch transmission 16 contains a first input shaft 24, which is designed as a solid shaft, and a second input shaft 26, which is designed as a hollow shaft concentric to the first input shaft 24. The first input shaft 24 is connected to an output element of the first clutch 28 of the dual clutch arrangement 14. The second input shaft 26 is connected to an output element of a second clutch 30 of the dual clutch arrangement 14.

The dual clutch transmission 16 furthermore has a first layshaft 32 and a second layshaft 34, arranged in parallel and staggered to the input shafts 24, 26. The layshafts 32, 34 are connected by a drive gear set 36 to the differential 18. The drive gear set 36 contains a first fixed gear 38, which is joined to the first layshaft 32, and another fixed gear 40, which is joined to the second layshaft 34. The two fixed gears 38, 40 are in engagement with the drive gear 42 of the differential 18.

Mounted on the first transmission input shaft 24, looking from an axial end of the dual clutch transmission 16 opposite the transmission input, are a first fixed gear 44 for forward gear 1, a second fixed gear 46 for forward gear 3, and a third fixed gear 48 for forward gears 5 and 7. In corresponding fashion, looking from the axial end opposite the transmission input, there are mounted on the second input shaft 26 a first fixed gear 50 for forward gears 4 and 6 and a second fixed gear 52 for forward gear 2 as well as reverse gear R.

On the first layshaft 32, again looking from the end opposite the transmission input, there are mounted and able to rotate a first idler 54 for forward gear 1, another idler 56 for forward gear 7, another idler 58 for forward gear 6 and another idler 60 for forward gear 2. The idler 60 for forward gear 2 is firmly connected to an auxiliary gear 62, which serves to establish the reverse gear R, as explained below.

On the second layshaft 34, again looking from the end opposite the transmission input, there are mounted and able to rotate a first idler 64 for forward gear 3, another idler 66 for forward gear 5, another idler 68 for forward gear 4 and another idler 70 for reverse gear R.

The fixed gears 38, 40 of the drive gear set 36 are arranged adjacent to the transmission input, while a parking brake gear 72 is mounted on the second layshaft 34 between the fixed gear 40 and the idler 70 for the reverse gear R. The parking brake gear 72 is oriented in the axial direction with the idler 60 for forward gear 2.

Between the idlers 54, 56 there is arranged a first shift clutch assembly 76 with two shift clutches for engaging and disengaging the forward gears 1 and 7. Between the idlers 58, 60 for the forward gears 6 and 2 there is arranged a second shift clutch assembly 78 for engaging and disengaging these forward gears.

On the second layshaft 34, between the idler 64 for forward gear 3 and the idler 66 for forward gear 5 there is arranged a third shift clutch assembly 80 for engaging and disengaging these forward gears. Finally, on the second layshaft 34, between the idler 68 for forward gear 4 and the idler 70 for reverse gear R there is arranged a fourth shift clutch assembly 82 for engaging and disengaging these gears.

The fixed gear 44 stands in engagement with the idler 54. The fixed gear 46 stands in engagement with the idler 64. The fixed gear 48 stands in engagement with the idlers 56, 66. The fixed gear 50 stands in engagement with the idlers 58, 68. The fixed gear 52 stands in engagement with the idler 60.

The auxiliary gear 62 stands in engagement with the idler 70 for the reverse gear R, in order to accomplish a reversal of direction of turning in this way, without having to provide a separate auxiliary shaft.

The gear set 46, 64 for the forward gear 3 is arranged in the axial direction between the gear set 54, 44 for forward gear 1 and the shift clutch assembly 76. For this purpose, the idler 54 is connected by a stub shaft 84 to the first shift clutch assembly 76.

The parking brake gear 72 serves to establish a parking brake arrangement P, having for example a parking brake pawl, not otherwise shown.

In the dual clutch transmission 16, two dual uses are realized for the gears 5, 7 and 4, 6. Moreover, the parking brake gear 72 is oriented axially with the idler 60 for forward gear 2. On the whole, in this way an axially compact design can be achieved. A suitable transmission ratio for the reverse gear R can be adjusted with the auxiliary gear 62.

An electric machine 90 is linked to the idler 68 for forward gear 4. This idler 68 therefore serves to hybridize the dual clutch transmission 16. The electric machine 90 has an output shaft 91, which is oriented in parallel with the shafts 24, 26, 32, 34 and is connected to a gear 92. The gear 92 stands in engagement with the idler 68 for forward gear 4, so that a power transmission pathway 93 is formed from the output shaft 91 to the idler 68, forming a coupling gear in the present case. The drive gear 92 in this embodiment is coupled directly to the coupling gear (idler 68). Alternatively to this, it is also possible to couple the drive gear 92 with another gear of the dual clutch transmission 16. As an example, it is shown that the drive gear 92 can also stand in engagement with the first fixed gear 50, so that this forms a coupling gear. In this case, a power transmission pathway 93' is formed from the machine output shaft 91 to the gear 50.

Alternatively to this, it is possible to connect the machine output shaft 91 to a drive gear which stands in engagement via an intermediate gear with the idler 68, in order to form a coupling gear set in this way, which is formed by the drive gear and the intermediate gear.

A slip clutch 94 is arranged in the power transmission pathway 93, which is shown schematically in FIG. 1, namely at the machine output shaft 91. The slip clutch 94, however, can also be arranged anywhere else in the power transmission pathway 93.

The slip clutch 94 is designed as an overload protection clutch, wherein the slip clutch 94 can transmit torque up to a threshold torque value, which is a function of a characteristic torque of the electric machine 90, a function of a maximum torque of the coupling gear 68 (or 50, for example), and/or a function of a coupling transmission ratio, wherein the coupling transmission ratio is formed between the machine output shaft 91 and the coupling gear 68 (or 50). In the latter case, the threshold torque value also depends on where the slip clutch 94 is arranged within the power transmission pathway 93.

The following figures show further embodiments of automotive transmission layouts or parts thereof corresponding in general to the above-described layout in terms of design and operation. Therefore, the same elements are designated by the same reference numbers. In what follows, the differences shall mainly be discussed.

Figure 2:
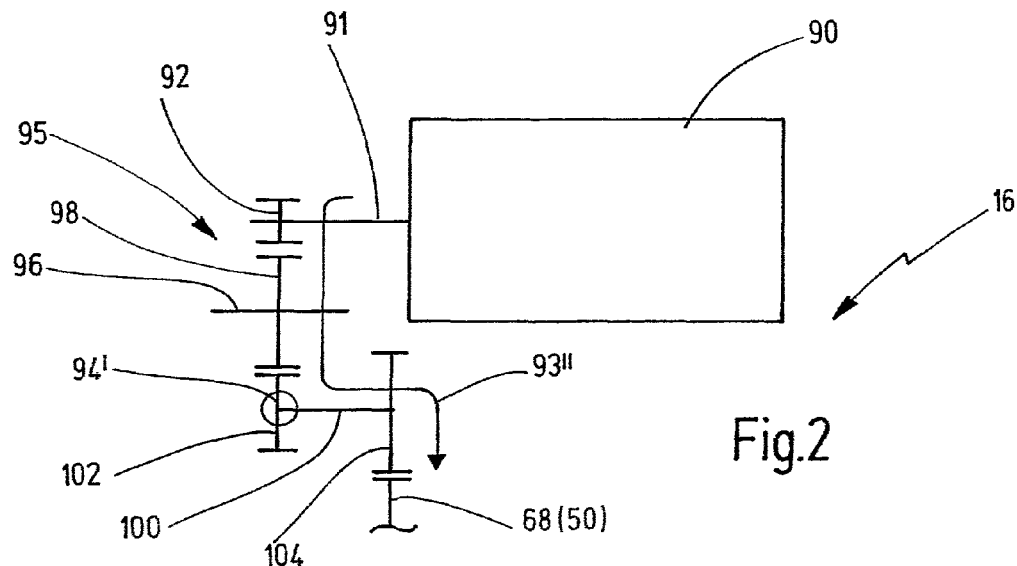
FIG. 2 an alternative embodiment of a coupling gear set.

FIG. 2 shows a linkage of an electric machine 90 to a coupling gear 68 (or 50) via a power transmission pathway 93". The power transmission pathway 93" has a coupling gear set 95. More precisely, the machine output shaft 91 is firmly connected to a drive gear 92. On an auxiliary shaft 96 there is mounted an auxiliary gear 98, which stands in engagement with the drive gear 92. Moreover, an intermediate shaft 100 is provided in parallel with the auxiliary shaft 96, on which a first intermediate gear 102 and a second intermediate gear 104 are mounted. The first intermediate gear 102 stands in engagement with the auxiliary gear 98. The second intermediate gear 104 stands in engagement with the coupling gear 68 (or 50).

In this configuration, a slip clutch 94' is formed on the intermediate shaft 100, preferably between the first intermediate gear 102 and the intermediate shaft 100. Alternatively, the slip clutch can also be formed between the auxiliary gear 98 and the auxiliary shaft 96, or between the drive gear 92 and the machine output shaft 91.

Design examples of such slip clutches are described in the following FIGS. 3 to 5, each of which configurations can be combined with the above-described transmission layouts 16.

Figure 3:
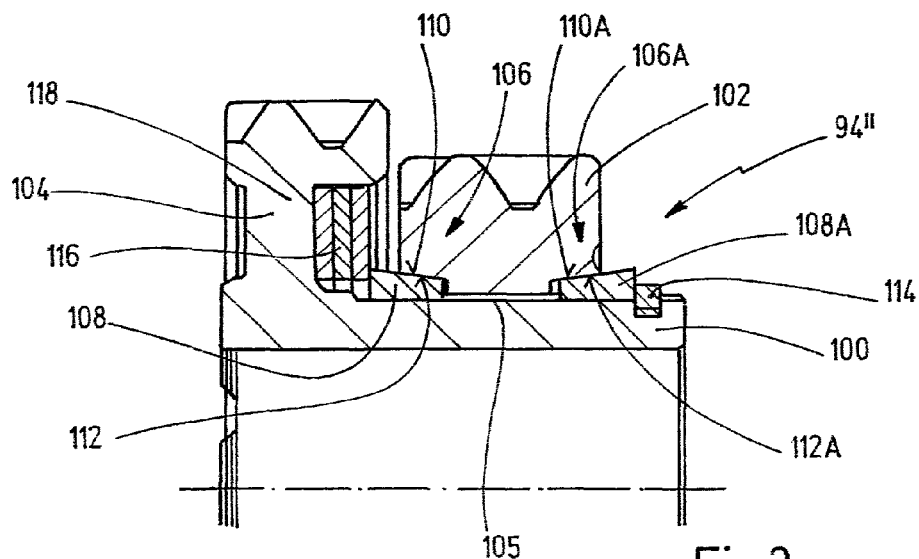
FIG. 3 a longitudinal section through an intermediate shaft with a slip clutch.

FIG. 3 shows a slip clutch 94" which is placed between an intermediate shaft 100 and a first intermediate gear 102. The first intermediate gear 102 is mounted rotatably on the intermediate shaft 100, for example, by means of a needle bearing 105. The intermediate shaft 100 in this embodiment is connected, firmly against rotation, to a second intermediate gear 104, and can in particular form a single piece with it.

The slip clutch 94" contains a first friction pairing 106, which is placed between the first intermediate gear 102 and a first friction taper ring 108. The first friction taper ring 108 forms here a first torque transmission element, and the first intermediate gear 102 forms here a second torque transmission element. The first friction pairing 106 contains a first friction taper 110 on a segment of the outer circumference of the first friction taper ring 108 and a second friction taper 112 on a segment of the inner circumference of the first intermediate gear 102. The first friction taper ring 108 is connected, firmly against rotation, to the intermediate shaft 100, but is mounted so that it has limited axial movement relative to it, for example, by means of a spline or the like.

The slip clutch 94" moreover contains another friction pairing 106A with another friction taper ring 108A, on whose outer circumference is formed another first friction taper 110A. On the first intermediate gear 102, another second friction taper 112A is formed on the inner circumference, forming the additional friction pairing 106A with the other first friction taper 110A.

The friction pairings 106, 106A are formed at axially opposite ends of the first intermediate gear 102. The angles of the friction tapers lie preferably in a range between 3° and 20°, especially in a range between 5° and 10°, and are inclined in opposite direction, similar to an X-arrangement for bearings.

The additional friction taper ring 108A is secured in the axial direction relative to the intermediate shaft 100 by an axial securing ring 114. Between the first friction taper ring 108 and a radial segment 118 connected to the intermediate shaft 100, being formed in the present case by a radial segment of the second intermediate gear 104, is arranged a spring mechanism 116 in the form of a disc spring assembly 116. The friction pairings 106, 106A are biased by means of the axially operating spring mechanism 116. The spring constants of the spring mechanism 106, in conjunction with the angles of the friction pairings 106, 106A, as well as the materials used and the areas of the friction pairings, determine the threshold torque value characterizing the slip clutch 94".

Figure 4:
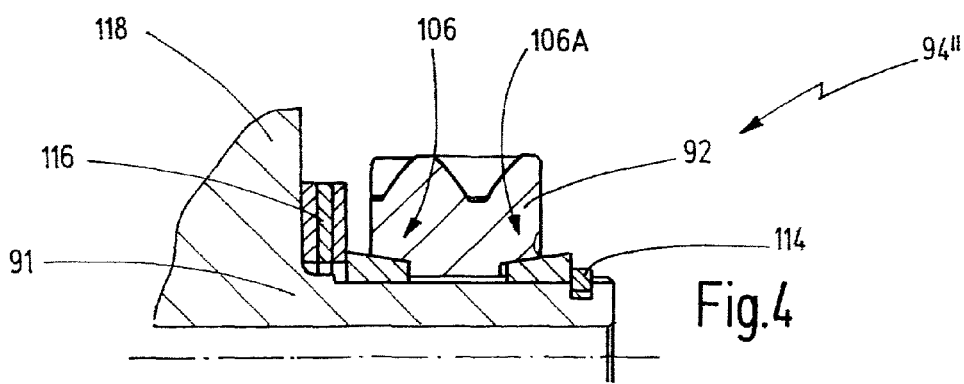
FIG. 4 a representation comparable to FIG. 3 of a machine output shaft with a slip clutch.

FIG. 4 shows the same slip clutch 94", but in this case arranged between the drive gear 92 and the machine output shaft 91, while a radial segment 118 is formed on the machine output shaft 91, not necessarily formed as a gear. The spring mechanism 116 of the slip clutch 94" is braced against the radial segment 118.

Figure 5:
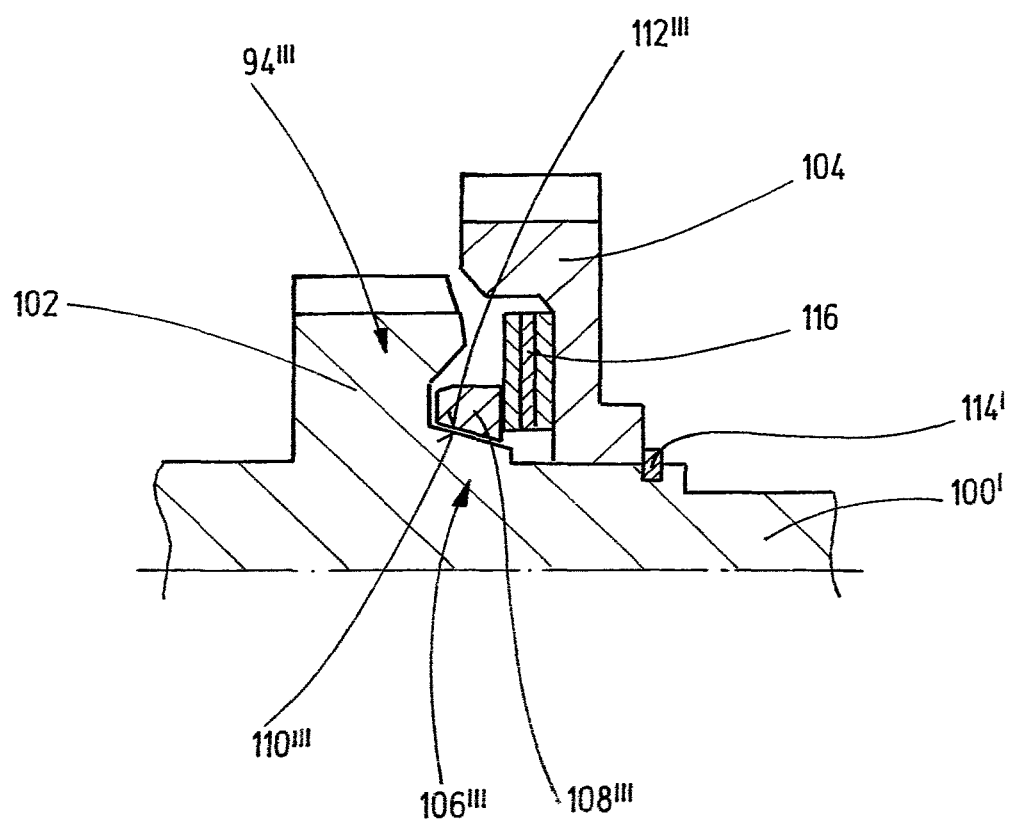
FIG. 5 a longitudinal section through another embodiment of an intermediate shaft with a slip clutch.

FIG. 5 shows another variant of a slip clutch 94''', which can be arranged for example between a first intermediate gear 102 and a second intermediate gear 104. In this layout, the first intermediate gear 102 is joined to the intermediate shaft 100' firmly against rotation. The second intermediate gear 104 is mounted on the intermediate shaft 100' and able to rotate, and it is secured in the axial direction on the intermediate shaft 100' by an axial securing ring 114'.

The slip clutch 94''' contains a single friction pairing 106''', which is placed between the first intermediate gear 102 or the intermediate shaft 100 and a friction taper ring 108'''. The friction taper ring 108''' has a first friction taper 110''' on its inner circumference. A second friction taper 112''' is formed on a segment of the outer circumference of the intermediate shaft 100' or of the first intermediate gear 102. A spring mechanism 116 is arranged in the axial direction between the second intermediate gear 104 and the friction taper ring 108''' in order to bias the friction pairing 106''' in the axial direction.

In all variants the spring mechanism 116 can be arranged in an axial recess, such as is represented for example in FIGS. 3 and 5, in order to optimize the design space in this way.

While the friction taper rings 108, 108A of FIG. 3 are mounted firmly against rotation, yet axially movable in relation to the intermediate shaft 100, the friction taper ring 108''' is mounted both rotatable and also axially movable in relation to the intermediate shaft 100'.

What is claimed is:

1. Hybrid automotive transmission arrangement with a gear transmission for establishing at least one transmission ratio between a transmission input and a transmission output, wherein the gear transmission has a gear set with a coupling gear, with an electric machine which has a machine output shaft with a drive gear, which is coupled directly or via a coupling gear set to the coupling gear of the transmission gear set so that a power transmission pathway is established from the machine output shaft to the coupling gear, wherein a slip clutch is arranged in the power transmission path, wherein the slip clutch is designed as an overload protection clutch, so that the slip clutch can transmit torque up to a threshold torque value, which is a function of a characteristic torque value of the electric machine.

2. Hybrid automotive transmission arrangement with a gear transmission for establishing at least one transmission ratio between a transmission input and a transmission output, wherein the gear transmission has a gear set with a coupling gear, with an electric machine which has a machine output shaft with a drive gear, which is coupled directly or via a coupling gear set to the coupling gear of the transmission gear set so that a power transmission pathway is established from the machine output shaft to the coupling gear, wherein a slip clutch is arranged in the power transmission path, wherein the slip clutch is designed as an overload protection clutch, so that the slip clutch can transmit torque up to a threshold torque value, which is a function of a maximum torque of the coupling gear.

3. Hybrid automotive transmission arrangement with a gear transmission for establishing at least one transmission ratio between a transmission input and a transmission output, wherein the gear transmission has a gear set with a coupling gear, with an electric machine which has a machine output shaft with a drive gear, which is coupled directly or via a coupling gear set to the coupling gear of the transmission gear set so that a power transmission pathway is established from the machine output shaft to the coupling gear, wherein a slip clutch is arranged in the power transmission path, wherein a coupling transmission ratio is established between the machine output shaft and the coupling gear, wherein a threshold torque value is a function of the coupling transmission ratio.

4. Hybrid automotive transmission arrangement with a gear transmission for establishing at least one transmission ratio between a transmission input and a transmission output, wherein the gear transmission has a gear set with a coupling gear, with an electric machine which has a machine output shaft with a drive gear, which is coupled directly or via a coupling gear set to the coupling gear of the transmission gear set so that a power transmission pathway is established from the machine output shaft to the coupling gear, wherein a slip clutch is arranged in the power transmission path, wherein the slip clutch has at least one friction taper pairing, and wherein the friction taper pairing has a first friction cone at a first torque transmission element and a second friction cone at a second torque transmission element, wherein the first torque transmission element and the second torque transmission element are biased by a spring mechanism.

5. Hybrid automotive transmission arrangement according to claim 4, wherein the first torque transmission element is a friction taper ring, while the second torque transmission element is a friction taper gear.

6. Hybrid automotive transmission arrangement according to claim 5, wherein the friction taper gear is the driving gear.

7. Hybrid automotive transmission arrangement according to claim 5, wherein the friction taper gear is a gear of the coupling gear set.

8. Hybrid automotive transmission arrangement according to claim 5, wherein the friction taper ring is joined to a shaft segment firmly against rotation.

9. Hybrid automotive transmission arrangement according to claim 8, wherein the friction taper gear has two friction tapers, each friction taper being assigned a friction taper ring which is joined to the shaft segment firmly against rotation.

10. Hybrid automotive transmission arrangement according to claim 9, wherein one of the friction taper rings is secured axially on the shaft segment, the spring mechanism being arranged between the other friction taper ring and a radial segment joined to the shaft segment.

11. Hybrid automotive transmission arrangement according to claim 5, wherein the friction taper gear is a drive gear mounted on the machine output shaft.

12. Hybrid automotive transmission arrangement according to claim 5, wherein the coupling gear set has a first intermediate gear and a second intermediate gear, which is arranged coaxially with the first intermediate gear, while the friction taper gear is at least one of the first and the second intermediate gear.

* * * * *